US012812329B2

(12) United States Patent
R

(10) Patent No.: US 12,812,329 B2
(45) Date of Patent: Nov. 24, 2026

(54) SYSTEMS, METHODS, AND PROCESSES OF CREATING A ROUTE THROUGH A FACILITY BASED ON COMMUNICATION BETWEEN A PORTABLE DEVICE AND EVENT DETECTION DEVICES WITH BUILT-IN COMMUNICATION COMPONENTS

(71) Applicant: Honeywell International Inc., Charlotte, NC (US)

(72) Inventor: Murali R, Hosur (IN)

(73) Assignee: Honeywell International Inc., Charlotte, NC (US)

( * ) Notice: Subject to any disclaimer, the term of this patent is extended or adjusted under 35 U.S.C. 154(b) by 509 days.

(21) Appl. No.: 17/989,349

(22) Filed: Nov. 17, 2022

(65) Prior Publication Data

US 2024/0171938 A1 May 23, 2024

(51) Int. Cl.
*H04W 4/024* (2018.01)
*H04W 4/33* (2018.01)
*H04W 4/80* (2018.01)

(52) U.S. Cl.
CPC ............. *H04W 4/024* (2018.02); *H04W 4/33* (2018.02); *H04W 4/80* (2018.02)

(58) Field of Classification Search
CPC ......... H04W 4/024; H04W 4/33; H04W 4/80; H04W 4/023; H04W 4/90; G08B 25/10;
(Continued)

(56) References Cited

U.S. PATENT DOCUMENTS 9,767,679 B2 9/2017 Piccolo, III et al.
9,990,841 B2 6/2018 Moffa
(Continued)

FOREIGN PATENT DOCUMENTS

CN 113347571 A 9/2021
FR 2945220 11/2010
(Continued)

OTHER PUBLICATIONS

Y. Inoue, A. Sashima, T. Ikeda and K. Kurumatani, "Indoor Emergency Evacuation Service on Autonomous Navigation System using Mobile Phone," 2008 Second International Symposium on Universal Communication, Osaka, Japan, 2008, pp. 79-85, doi: 10.1109/ISUC.2008.49. (Year: 2008).*
(Continued)

*Primary Examiner* — Wesley L Kim
*Assistant Examiner* — Erkin Abdullaev
(74) *Attorney, Agent, or Firm* — Brooks, Cameron & Huebsch, PLLC

(57) ABSTRACT

Systems, methods, and processes of creating a route based on communication between a portable device and event detection devices are described herein. One method, includes using short range communication to communicate between the number of event detection devices and a portable device that are within a threshold communication range of each other, determining, a specific location within a floor at which the portable device is located, determining a route indicating a number of the event detection devices through which the portable device will transit to the specific location of the first event, and creating a visual floor representation, including an indication of a specific location where a first event was detected and the specific location of the portable device and the determined route between them.

20 Claims, 3 Drawing Sheets

(58) Field of Classification Search
CPC ... G08B 7/066; G08B 29/14; H04M 1/72412; H04M 1/72424
See application file for complete search history.

(56) References Cited

U.S. PATENT DOCUMENTS

| | | | | |
|---|---|---|---|---|
| 10,045,187 | B1 * | 8/2018 | Soleimani | H04W 4/90 |
| 10,074,265 | B2 | 9/2018 | Moffa | |
| 10,470,155 | B2 * | 11/2019 | Abou-Rizk | H04B 17/3913 |
| 2001/0036832 | A1 | 11/2001 | McKay | |
| 2006/0226970 | A1 * | 10/2006 | Saga | G08B 7/066 340/506 |
| 2011/0183650 | A1 * | 7/2011 | McKee | H04M 1/724 455/567 |
| 2016/0192140 | A1 * | 6/2016 | Park | H04W 40/244 455/456.3 |
| 2016/0217668 | A1 * | 7/2016 | Meganathan | H04W 4/80 |
| 2017/0245110 | A1 * | 8/2017 | Ruiz | H04W 4/023 |
| 2018/0160260 | A1 * | 6/2018 | Meganathan | H04W 4/029 |
| 2018/0328737 | A1 * | 11/2018 | Frey | H04W 4/33 |
| 2018/0356241 | A1 * | 12/2018 | Correnti | H04L 67/12 |
| 2019/0318611 | A1 * | 10/2019 | Gravel | H04W 4/029 |
| 2020/0096346 | A1 * | 3/2020 | Dhandapani | H04W 4/024 |
| 2020/0374657 | A1 * | 11/2020 | Ravindran | G08B 29/043 |
| 2021/0350693 | A1 | 11/2021 | Nalukurthy | |
| 2022/0051310 | A1 * | 2/2022 | Graube | G06Q 10/087 |

FOREIGN PATENT DOCUMENTS

| | | | | |
|---|---|---|---|---|
| IT | 202100007028 | A1 | 9/2022 | |
| KR | 102285927 | B1 * | 8/2021 | G01K 1/02 |

OTHER PUBLICATIONS

Aedo I, Yu S, DÃ-az P, AcuÃ±a P, Onorati T. Personalized alert notifications and evacuation routes in indoor environments. Sensors (Basel). 2012;12(6):7804-27. doi: 10.3390/s120607804. Epub Jun. 8, 2012. PMID: 22969373; PMCID: PMC3436002. (Year: 2012).*

Park, et al. "Apparatus And Method For Evacuation Route Guidance." KR-102285927-B1, PE2E English translation, Aug. 4, 2021 (Year: 2021).*

Huixian, et al., "Design of Intelligent Fire-Fighting System of a Big Public Building Emergency Evacuation Navigation System for Mobile Terminal"; IEEE Xplore, 2018 13th Inernational Conference on Computer Science & Education (ICCSE); Sep. 20, 2018 (3 pgs; Abstract Only) https://ieeexplore.ieee.org/abstract/document/8468780/authors#authors.

Zhang, et al., "A Framework for an Intelligent and Personalized Fire Evacuation Management System"; MPDI, Sensors, vol. 19, Jul. 16, 2019 (19 pgs) https://www.mdpi.com/1424-8220/19/14/3128/htm.

Pantelic, et al., "A preference driven multi-criteria optimization tool for HVAC design and operation"; Elsevier, Energy and Buildings, vol. 55, Apr. 21, 2012 (10 pgs).

Noakes, et al., "Modeling infection risk and energy use of upper-room Ultraviolet Germicidal Irradiation systems in multi-room environments"; Taylor & Francis Group, Science and Technology for the Built Environment, vol. 21, 2015 (14 pgs).

* cited by examiner

SYSTEMS, METHODS, AND PROCESSES OF CREATING A ROUTE THROUGH A FACILITY BASED ON COMMUNICATION BETWEEN A PORTABLE DEVICE AND EVENT DETECTION DEVICES WITH BUILT-IN COMMUNICATION COMPONENTS

TECHNICAL FIELD

The present disclosure relates to systems, methods, and processes of creating a route through a facility based on communication between a portable device and event detection devices with built-in communication components.

BACKGROUND

Facilities equipped with alarm systems allow for early detection of an emergency event, such as a fire or presence of a harmful chemical situation occurring. This allows for emergency personnel to arrive more quickly.

The systems utilize sensing devices (fire detectors, smoke detectors, chemical sensors, hand pull devices, etc.) spread throughout the facility that can detect when an event may be occurring. These alarm system devices communicate sensor information to an on premise alarm system control panel that collects and analyzes the data to determine whether an emergency event is occurring, and contacts emergency personnel to come to the facility to deal with the event.

Typically, such facilities are large and can be complex (large building, multiple floors, facilities with multiple buildings). Thus, it may be difficult for emergency personnel to navigate the facility, especially, for example, once smoke begins to fill the interior spaces of the facility. This can include finding the correct stairways, room, and hallways, etc.

In some situations, a map, for example, from a building information model (BIM) can be generated and used by emergency personnel, but it may be incomplete or incorrect. Further, it does not provide information to guide the emergency personnel to the right location, particularly in real-time (live guidance).

Additionally, during service of the alarm system, technicians may need guidance in navigating the facility to perform repairs or replacement of alarm system devices, add new devices to the system through a commissioning process, and/or perform a walk test to visually inspect the devices and/or check their functionality via in-person physical inspection. For example, the technician may be new to the facility and/or the layout of the interior space of the facility is confusing. Or, there may be many devices in an area that are to be serviced and it may be difficult to determine which alarm system device needs service or what type of service a particular device needs. such issues can slow progress of emergency personnel or alarm system technicians and may result in inefficient service or potentially loss of property or life of building occupants.

DETAILED DESCRIPTION

Figure 1:
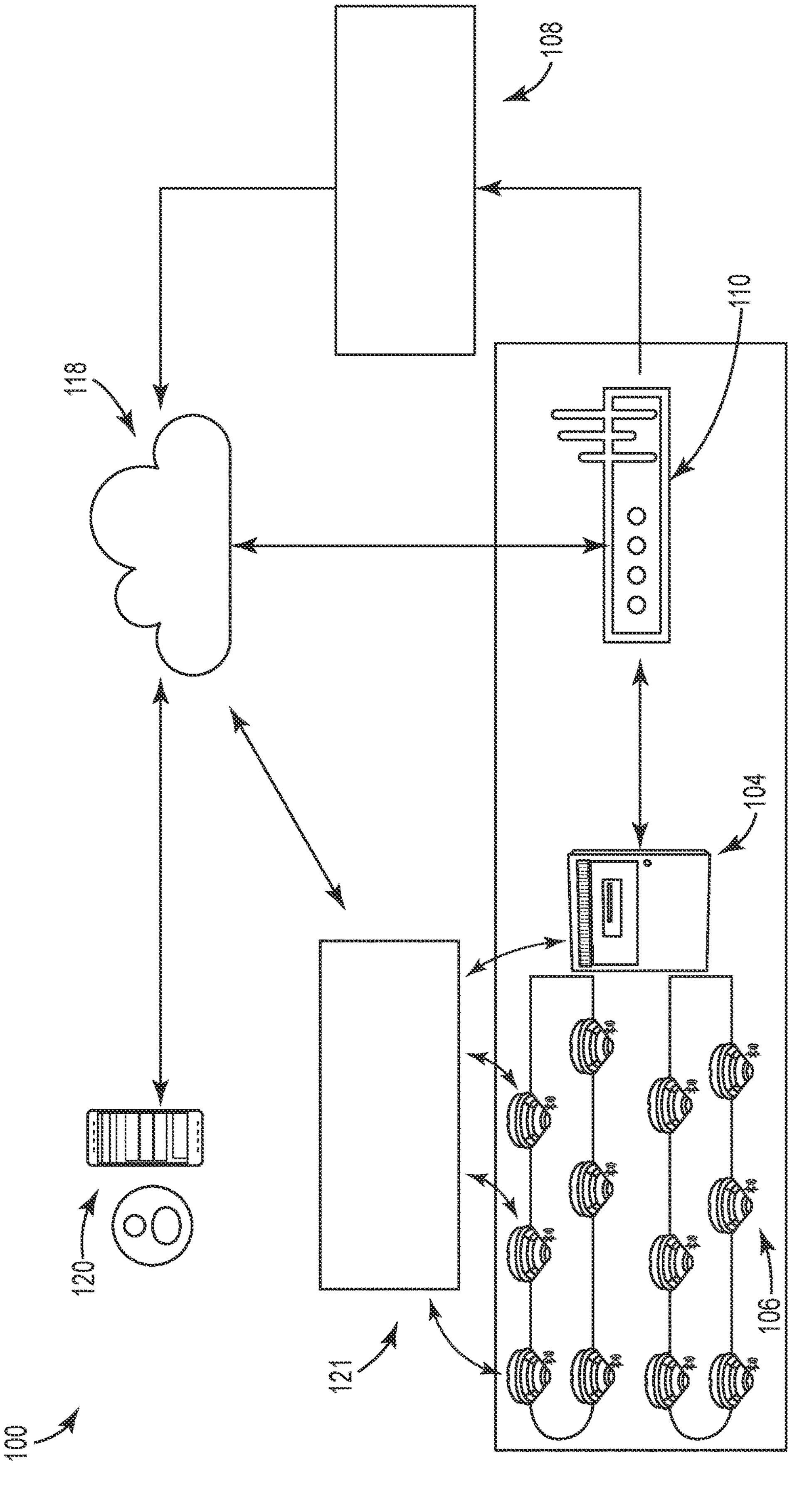
FIG. 1 is an example of an event alarm system in accordance with one or more embodiments of the present disclosure.

Systems, methods, and processes of creating a route through a facility based on communication between a portable device and event detection devices with built-in communication components are described herein. Presently, there is no mechanism in a building safety system to use event detectors with built-in communication components to guide personnel to exact locations during maintenance or a building safety event.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a building safety event notification system for use in accordance with one or more embodiments of the present disclosure. In the illustrated embodiment, the building safety event notification system 100 includes an alarm system 102, a central monitoring station having at least one computing device 108, a remote server (e.g., cloud server) 118, a portable device 121, and one or more building owner/operator/emergency personnel communication application devices 120.

An event alarm signal is generated in response to data from one or more alarm system event detection devices 106 (e.g., smoke detectors) within the alarm system 102 indicating that an event (e.g., fire) may be occurring. As used herein, the term "event" may refer to any condition occurring within the building, such as a fire, smoke, or chemical sensor activation, an alarm trigger (pull station), or a breach of security.

It may also be referred to as a fault detected in any of the components of the system 100, such as a fault in one or more of the alarm system event detection devices 106. The central monitoring station may be staffed by employees of the provider of the alarm system 102, and they may not know specific details of each building they are monitoring, but rather, are charged with alerting appropriate emergency event response personnel based on the type of response needed and coordinating the response to the building to address the event that is occurring at the building.

The alarm system 102 can be any system that is used to monitor events that will affect occupants of the building. As shown in FIG. 1, the alarm system illustrated is a fire alarm system and includes a number of alarm system event detection devices 106 and a control panel 104 for managing the operation of the alarm system 102 and its devices.

As used herein, the term "control panel" refers to a device at the facility to control components of an alarm system of a facility (building). For example, the control panel 104 can be a fire control panel that can receive information from event detection devices (fire detectors, smoke detectors) 106 and determine whether an emergency event (a fire) is occurring or has occurred.

The control panel may be configured to transmit information about the emergency event to the computing device 108 and to the cloud 118. This information, may include, for example, a unique identifier of the event detection device 106 which detected the event, a date and time of the event, a status of the event (e.g., resolved, unresolved), or an event type (e.g., smoke detected, communication fault).

The control panel 104 is connected to the number of alarm system event detection devices 106. As used herein, the term "alarm system event detection device" refers to a device that can receive an input relating to an event. Such alarm system event detection devices 106 can be a part of an alarm system of the facility and can include devices such as fire sensors, smoke detectors, heat detectors, carbon monoxide (CO) detectors, other chemical detector, or combinations of these; interfaces; pull stations; input/output modules; aspirating units; and/or audio/visual devices, such as speakers, sounders, buzzers, microphones, cameras, video displays, video screens, among other types of alarm system devices.

These alarm system event detection devices 106 can be automatic, self-test devices, such as smoke detectors, heat detectors, CO detectors, and/or others. Such self-test devices can include mechanisms that generate aerosols, heat, carbon monoxide, etc. and sense these items as appropriate to the type of device being tested in the device to test the performance of the device. This can, for example, be to test the event detection device's thermal, chemical, and/or photo sensing capabilities.

The alarm system event detection devices 106 utilized in the embodiments of the present disclosure each include communication components (transmitters, receivers, transceivers) that allow them to directly or via another device of the system communicate with a portable device 121, carried by a technician or emergency responder, for example. This collaboration between the portable device 121 and the system event detection devices 106, allow for the enhanced functions described herein.

The alarm system 102 can also include an edge/gateway device 110. The gateway device 110 acts as a pass-through device for communicating between the alarm system 102 at the facility and the central monitoring station 108 and other components of the event notification system 100 that are at remote locations (i.e., outside the facility).

A gateway device 110 of an alarm system 102 at a facility (building) can, for example, report event alarm signals to one or more central monitoring servers. These servers may be on premise (within the facility) or, as shown in the example of FIG. 1, off premise (at a remote location from the alarm system components including the event detection devices 106, the gateway device 110, and the control panel 104).

From there, the event alarm signals can, for example, be reported to the appropriate central monitoring station. This is done through the computing device 108. For example, information about event alarm signals may be displayed on a graphical user interface of a remote or local application on the computing device 108.

The central monitoring station includes administrators that, as discussed above, coordinate activities to respond appropriately based on the type of event that is occurring. For example, a fire event would need a fire-based response that would likely include alerting a fire station to send trucks and contacting medical personnel, if injuries seem likely. The information provided could include the type of fire so that emergency responders know whether they will need water or foam to put the fire out.

For a security issue, security personnel and/or the police would be contacted. For an issue relating to the operation of an alarm system device 106, a technician would be contacted and directed to the location of the faulty alarm system event detection device 106. The central monitoring servers are connected back to one or more alarm systems on site and/or remote (cloud) servers, such as alarm system 102 and remote server 118.

Event alarm signals can also be transmitted to the remote server 118. These signals may include, for example, the time and date of the event, a network name, a unique identifier of the event detection device(s) 106 which detected the event, an event type, or an event status.

The remote server 118 may transmit this information to authorized users through portable device 121. For example, device 121 may be a mobile application accessible through a portable device, such as a mobile, phone, tablet, or laptop computing device.

In some current implementations, this information is represented only textually. Although a very experienced user who knows the building incredibly well may be able to decipher the location of the event based on information provided, such as the unique event detection device identification number, most users will not be able to determine the exact location within a floor of the event through text representation on device 121 alone.

Floorplans of each floor of the building may be accessible through the computing device 108. For example, such floorplans may be stored in the memory of the computing device 108. These building floorplans may be configured to include specific locations of all of the alarm system event detection devices 106. These floorplans may be accessed and portions of the plans may be transferred to device 121 to enable the creation of a route map as described herein.

Figure 2:
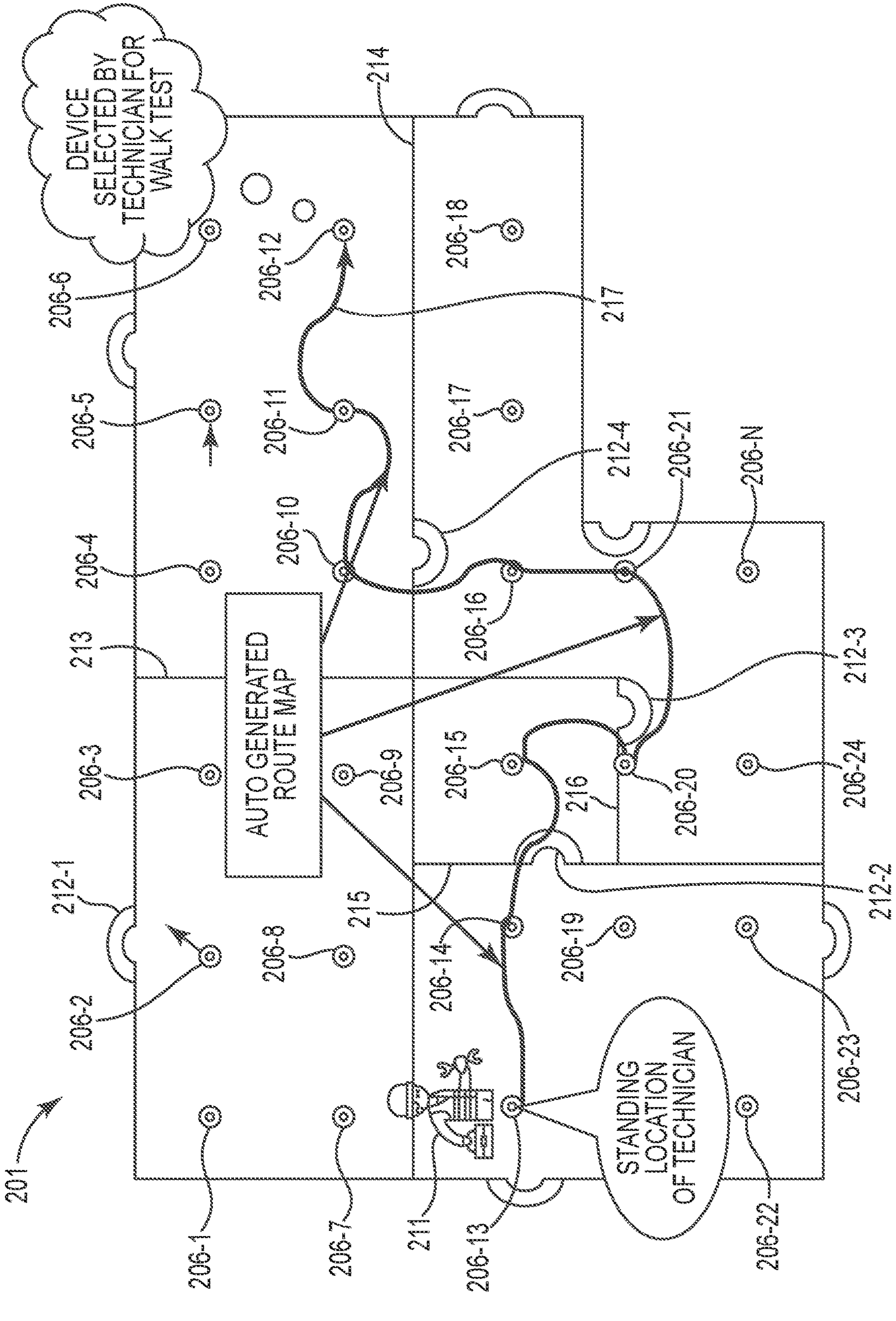
FIG. 2 is another example of an event alarm system having multiple alarm system event detection devices organized in areas of a facility and communicating with a portable device in accordance with one or more embodiments of the present disclosure.

FIG. 2 is another example of an event alarm system having multiple alarm system event detection devices organized in areas of a facility and communicating with a portable device in accordance with one or more embodiments of the present disclosure. When an event detector device detects an event the control panel can report the event detection to all end points (e.g., devices 110, 120, 121 188, and 108 of FIG. 1).

One or more of these devices can reference data stored in memory and can create a visual display of the location of the event on a facility layout. For example, as discussed above, a building floorplan can be accessed that contains the location of each event detection device within the building. These locations can, for example, be entered into memory and/or onto the floorplan (e.g., a jpg format file or other suitable visual file format) during a commissioning of the alarm system process, wherein the system is set up and made operational.

During commissioning, the commissioning technician can, for example, drag and drop an indicator for each of the event detection devices to the location on the floorplan that corresponds to the physical location of each event detection device, thereby creating a map of the physical location of each device in the area shown on the map. For instance, during commissioning, the technician can pull up the floorplan for building #1, floor #4 and the technician will verify that each event detection device is correctly located on the floorplan (i.e., its location on the floorplan correctly corresponds to its physical location on floor #4).

FIG. 2 represents the floorplan of building #1, floor #4. In this example, the floor 201 includes multiple spaces defined by walls 213, 214, 215, and 216. The floorplan also includes a number of doors or walkways 212 allowing movement onto floor #4 (e.g., 212-1) and movement between spaces (e.g., 212-2, 212-3, and 212-4). The floorplan also includes the locations or multiple event detection devices 206 that correspond to their physical location in these spaces of the floor.

When commissioning is complete, the alarm system is placed into normal operation (i.e., monitoring mode). In this mode, if an event is detected, for example, at event detection device 206-12, an indicator (e.g., change of color of the indicator for event detection device 206-12 making it different than the other event detection device indicators, the background behind the indicator for event detection device 206-12 beginning to flash, etc.). Any suitable type of indicator can be utilized.

In embodiments of the present disclosure, when an event is detected, the control panel can instruct the event detection devices to each activate a short range communication functionality (e.g., Bluetooth, Bluetooth low energy (BLE), infrared, near field communication, ultraband, Zigbee). In some embodiments, the control panel can initiate this process when instructed from a remote server (e.g., device 118 of FIG. 1), for example.

When this functionality is enabled, the event detection devices can communicate with other devices (e.g., a portable device, other event detection devices) that are within their range. By determining the proximity, for example, based on signal strength of nearby devices to the device indicating the event (206-12) and separately to a portable device 211 (used by a technician on site for periodic maintenance or emergency personnel on that floor) a route 217 to the device (206-12) can be mapped through the various spaces for the portable device user to make their way to the event indicating device (206-12).

For example, the process can execute instructions stored in memory (e.g., on the portable device, an event detection device, remote server 118 of FIG. 1, etc.) to determine the location of the portable device 211 used by a technician/emergency personnel based on a signal strength measurement with one or more nearby event detection devices (e.g., 206-13, 206-7, 206-14, 206-19, 206-22, and/or 206-23). The process can also execute instructions stored in memory on device 206-12 to measure the signal strength of other event detection devices that are in the direction of the portable device 211 used by a user.

For instance, it can check the signal strength of devices 206-6, 206-5, and 206-11 and based on the signal strength and direction to the portable device (e.g., discovered based on the location near an event detection device analysis done above) can select 206-11 as the next device along the technician/emergence personnel's path. This analysis can then be done from the perspective of device 206-11 to determine device 206-10 is the next device along the path.

When the analysis from the perspective of 206-10 is done, information stored in memory regarding the device 206-10's proximity to a door or walkway can be used as a factor for selecting 206-16 as the next device along the route. This information can, for example, be taken from a BIM format file.

Other relevant information can be additionally or alternatively used. For example, the location of walls (e.g., 213, 214) or other obstructions or the existence of restricted areas that will impede the movement of the portable device of the technician/emergency personnel can be used as factors in determining the next event detection device on the route. Likewise, this data can be taken from a BIM file or other location stored in memory.

For instance, when analyzing from the perspective of device 206-10, device 206-9 may be on the shortest path to the portable device 211. However, the other relevant data indicates that there is a wall that will not allow movement to 206-9. Additionally or alternatively, other relevant data may indicate there is a door or walkway toward 206-16, making that device along the preferred route.

In some embodiments, the route can be determined from the perspective of the portable device 211 and progress toward the event indicating device 206-12. In such an embodiment, the route would be determined first from device 211, through detection device 206-14, then through device 206-15, then through device 206-20, and so. In other embodiments, the process can determine the route by analyzing the route from both ends (e.g., from the perspective of portable device 211 and event indicating device 206-12). Here, the system would identify the route through devices 206-14, 206-15, and 206-11, and 206-10 at substantially the same time.

Such processes can be used until the entire route, between the portable device 211 and the device indicting the event, 206-12, has been established. Once the route calculation has been completed, a route map can be created based on the data from the floorplan and the route data. It should be noted that as used herein, the phrase "through the detection device" merely means through the area around the detection device where it has short range communication with the portable device.

In some embodiments, the created route map can be stored in memory and can be accessed in the future when a technician/emergency personnel carrying a portable device needs to get to this particular event detection device (e.g., 206-12). This implementation can be beneficial in quickly getting the portable device user moving toward the event indicating device.

Once the route between the portable device 211 and the event indicating device 206-12 is determined, the route is displayed on the floorplan which can be displayed on the portable device 211. This allows the portable device user to use it to assist them in navigating their way to the device 206-12.

In some embodiments, the route is shown with a line passing through the event detection devices along the route. In some embodiments, as the user gets closer to the next device along the route, an indicator indicates that they are getting closer (e.g., indicator color gets brighter). Additionally or alternatively, in some embodiments, as the user moves away from a detection device along the route, that indicator indicates that they are getting farther away (e.g., indicator color gets dimmer).

Some embodiments can include a dynamic mapping functionality. In such embodiments, the route can be changed as the portable device user is moving around the building. For example, if the user of portable device 211 mistakenly moves to event detection device 206-22, the route can be updated to direct the user through event detection device 206-19 (instead of through device 206-14) and then to device 206-15 to get the user back on the preferred route. This mistaken movement can be identified due to the portable device's communication with the event detection devices that are proximate to it (e.g., 206-13, 206-14, 206-19, 206-22, 206-23, and/or 206-15, etc.).

In some embodiments, when a technician wants to perform maintenance on a particular event detection device (e.g., 206-12) the process of passing information regarding the route can, for example, include selecting a particular event detection device, wherein that information is passed to a remote server (118), and then to the gateway (110), then to the control panel (104) where the control panel monitors the particular event detection device (206-12) until the maintenance (e.g., a self-test process done by the particular event detection device (206-12) is completed. Once completed, a completion confirmation is sent from the control panel, through the gateway, to the remote server which communicates the confirmation to one or more of the end points (e.g., 120, 121, 108).

In some embodiments, if the portable device user has access to a speaker, such as a BLE enabled headset, the system can execute instructions to provide voice guidance to the portable device user. For example, the voice guidance could indicate that the next event detection device along the path is 206-15 and/or that it is located in another room in the building and/or that they need to pass through a door or walkway to get to that next device (206-15).

In some embodiments, the system can provide an estimated time for arrival at the event indicating device. This can, for example, be determined based on prior trips along the same route, trips along routes of similar length and/or difficulty, and/or time and distance traveled by the portable device user along the route so far, among other suitable calculation methods. Such embodiments can be accomplished by storing previously recorded trip data stored in memory, for example, on the portable device.

In various embodiments, the unique device identifier can be a description of the location of the event detection device (e.g., printer room). This information can be provided with/on the floorplan and can thereby be communicated to the portable device user to aid in their navigation of the route.

In some embodiments where this process is used for maintenance, the system or one or more event detection devices can be disabled (not in normal operational mode) and still be used to create a route and during route navigation as their short range communication is still functional even when the event detection device is disabled (not detecting events).

Further, in some embodiments, when used for emergency situations there may be times when a portable device user encounters trouble within the building and needs assistance (e.g., becomes injured, passed out due to lack of oxygen, other person-down situations) their position can be identified based on the portable device's communication with the nearby event detection devices. For example, a threshold time period can be stored in memory and if the portable device remains stationary for a period of time long than the threshold time period, then an alert can be sent (e.g., to other emergency personnel such as at device 108 or 120 of FIG. 1) indicating that the portable device user may need assistance and their identified position.

Figure 3:
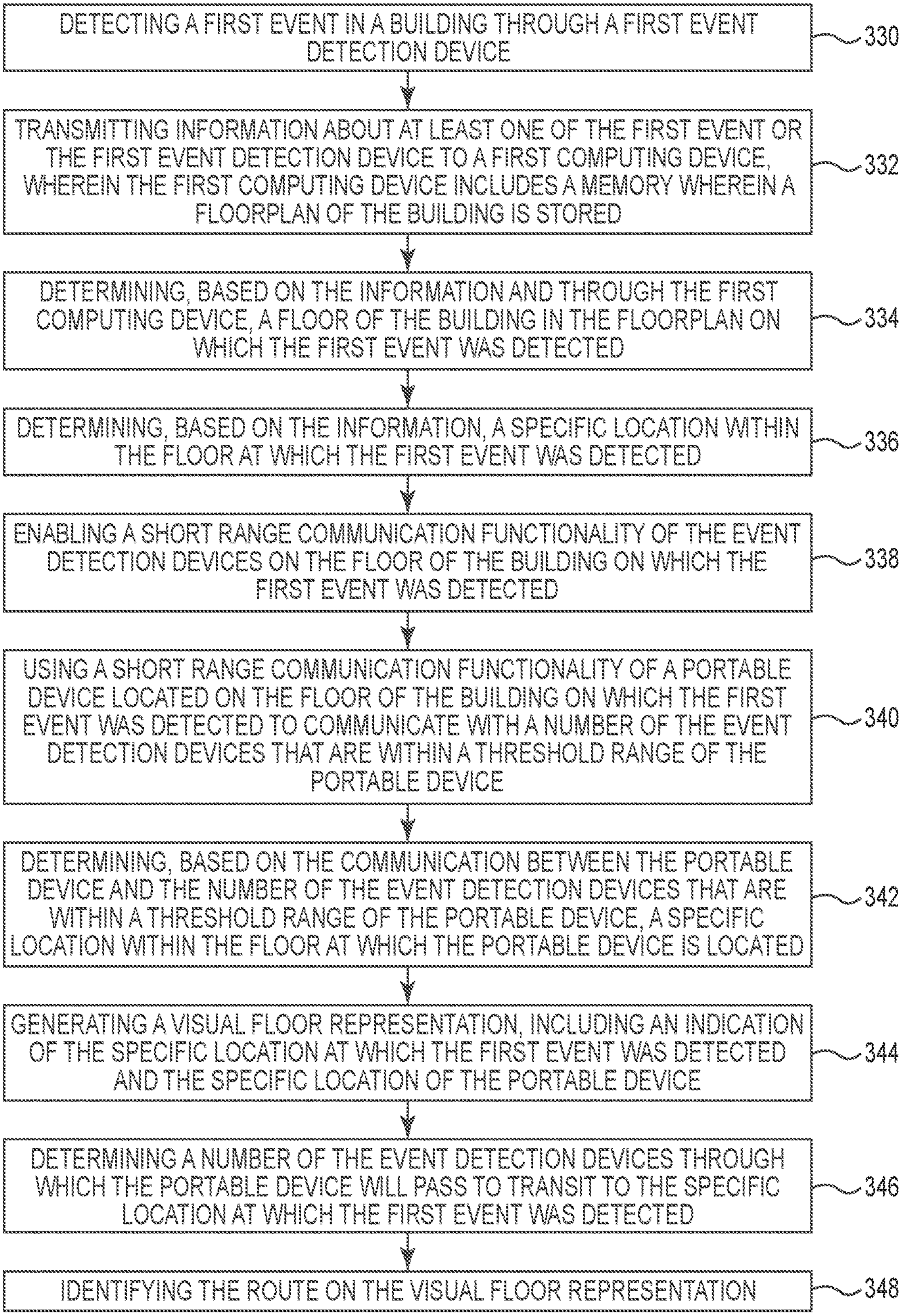
FIG. 3 represents a method according to an embodiment of the present disclosure.

FIG. 3 represents a method according to an embodiment of the present disclosure. This example method includes, detecting a first event in a building through a first event detection device, at block 330. This detection can, for example, be a maintenance item or an emergency situation, such as a fire or carbon monoxide reading over a threshold level.

At block 332, the method includes, transmitting information about at least one of the first event or the first event detection device to a first computing device, wherein the first computing device includes a memory wherein a floorplan of the building is stored. Such information can, for example, include a type of event that is occurring or type of detector that is part of the detection device, a location of the device (description of the location entered by a commissioning technician, a unique device identifier, etc.).

This information can be helpful, for example, for the system to know what floorplan information to access to build the route map and/or can be beneficial in helping the emergency personnel of technician know what to bring to the event location. Accordingly, this example method also includes, determining, based on the information and through the first computing device, a floor of the building in the floorplan on which the first event was detected, at block 334, and determining, based on the information, a specific location within the floor at which the first event was detected, at block 336.

The example method also includes, enabling a short range communication functionality of the event detection devices on the floor of the building on which the first event was detected, at block 338. The method also includes, using a short range communication functionality of a portable device located on the floor of the building on which the first event was detected to communicate with a number of the event detection devices that are within a threshold range of the portable device, at block 340. These elements allow the system to begin the analysis of creating the route for the technician or emergency personnel.

At block 342, the method includes, determining, based on the communication between the portable device and the number of the event detection devices that are within a threshold range of the portable device, a specific location within the floor at which the portable device is located. This element allows for the tracking of the technician/emergency personnel, updating of the visual route indicators (changing the colors based on the user's proximity to each detection device), and/or updating of the route on the map.

The example method also includes, generating a visual floor representation, including an indication of the specific location at which the first event was detected and the specific location of the portable device, at block 344.

To create the route map, the system determines a number of the event detection devices through which the portable device will pass to transit to the specific location at which the first event was detected, which is represented at block 346. Once the route is determined, the route is shown on the route map which is provided in the example method wherein it includes, identifying the route on the visual floor representation, at block 348.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method, comprising:

using a short range communication functionality to communicate between a number of event detection devices, a computing device, and a portable device that are within a threshold communication range of each other;

determining, by the computing device, a specific location within a floor at which the portable device is located;

determining, by the computing device, a route indicating the number of event detection devices through which the portable device will transit to a specific location of a first event, wherein each of the number of event detection devices includes an indicator light and a unique device identifier, and wherein the route is determined by analyzing the route from a perspective of the portable device and a perspective of the event detection device by which the specific location of the first event was detected;

activating, by the computing device, the indicator light of the event detection device proximate to the portable device to identify the determined route as the portable device approaches the event detection device; and transmitting, from the computing device, a portion of a building floorplan that includes specific locations of each of the number of event detection devices through which the portable device will transit to the portable device to enable the portable device to create a visual floor representation, including an indication of the specific location at which the first event was detected, the specific location of the portable device, the determined route between them, and the unique device identifier of each of the number of event detection devices through which the portable device will transit along the determined route to the specific location of the first event.

2. The method of claim 1, wherein the visual floor representation is transmitted to a remote server from the computing device.

3. The method of claim 1, wherein the short range communication functionality is Bluetooth low energy.

4. The method of claim 1, wherein the method further comprises determining physical locations for each of the event detection devices on the floor and positioning device indicators in locations on the visual floor representation corresponding to each event detection device's physical location.

5. The method of claim 1, wherein information is transmitted to the computing device through a gateway device.

6. The method of claim 1, further comprising tracking movement of the portable device based on its communication with different ones of the event detection devices.

7. The method of claim 6, further comprising, updating the specific location of the portable device on the visual floor representation based on the communication with the different ones of the event detection devices.

8. The method of claim 1, wherein determining the number of the event detection devices through which the portable device will pass to transit to the specific location at which the first event was detected is accomplished by using communication between the first event detection device and event detection devices within a threshold range of the first event detection device.

9. The method of claim 8, wherein the threshold range is determined based upon a signal strength of each event detection device in communication with the first event detection device and the threshold range being defined by a minimum signal strength.

10. The method of claim 8, wherein the threshold range is determined based upon at least one of: a location of a wall, another type of obstruction, or location of a restricted area, that will impede movement of the portable device.

11. A system, comprising:

a number of event detection devices configured to detect an event within a building; and an alarm system control panel configured to receive information about the event or the number of event detection devices from the number of event detection devices and transmit the information to a computing device;

wherein the computing device is configured to:

use a short range communication functionality to communicate between the number of event detection devices and a portable device that are within a threshold communication range of each other;

determine a specific location within a floor at which the portable device is located;

determine a route indicating a number of the event detection devices through which the portable device will transit to the specific location of a first event, wherein each of the number of event detection devices includes an indicator light and a unique device identifier, and wherein the route is determined by analyzing the route from a perspective of the portable device and a perspective of the event detection device by which the specific location of the first event was detected;

activate the indicator light of the event detection device proximate to the portable device to identify the determined route as the portable device approaches the event detection device; and transmit a portion of a building floorplan that includes a specific location of each of the number of event detection devices through which the portable device will transit to the portable device to enable the portable device to create a visual floor representation, including an indication of a specific location at which the first event was detected, the specific location of the portable device, the determined route between them, and the unique device identifier of each of the number of event detection devices through which the portable device will transit along the determined route to the specific location of the first event.

12. The system of claim 11, wherein determining the number of event detection devices through which the portable device will pass to transit to the specific location at which the first event was detected is accomplished by using communication between the portable device and event detection devices within a threshold range of the portable device.

13. The system of claim 11, wherein the system includes a threshold time period stored in memory and instructions to send an alert if the portable device remains stationary for a period of time long than the threshold time period.

14. The system of claim 11, wherein the computing device includes a memory wherein floorplans of each floor of the building are stored.

15. The system of claim 11, wherein a remote server includes a memory wherein floorplans of each floor of the building are stored therein and wherein the computing device accesses the floorplans and transmits data from the floorplans to the portable device to create the visual floor representation.

16. A method, comprising:

detecting a first event in a building through a first event detection device of a number of event detection devices, wherein each event detection device includes a unique device identifier;

transmitting information about at least one of the first event or the first event detection device to a computing device, wherein the computing device includes a memory wherein a floorplan of the building is stored;

determining, based on the information and through the computing device, a floor of the building in the floorplan on which the first event was detected;

determining, based on the information and using the computing device, a specific location within the floor at which the first event was detected;

enabling, by the computing device, a short range communication functionality of the event detection devices on the floor of the building on which the first event was detected;

using the short range communication functionality of a portable device located on the floor of the building on which the first event was detected to communicate with a number of the event detection devices that are within a threshold range of the portable device;

determining, based on the communication between the portable device and the number of the event detection devices that are within the threshold range of the portable device, a specific location within the floor at which the portable device is located;

determining, by the computing device, a route including the number of event detection devices through which the portable device will pass to transit to the specific location at which the first event was detected, wherein each of the number of event detection devices includes an indicator light, and wherein the route is determined by analyzing the route from a perspective of the portable device and a perspective of the first event detection device by which the first event was detected;

activating, by the computing device, the indicator light of the event detection device proximate to the portable device to identify the determined route as the portable device approaches the event detection device;

transmitting, from the computing device, a portion of the floorplan of the building that includes a specific location of each of the number of event detection devices through which the portable device will transit to the portable device for generation of a visual floor representation, including an indication of the specific location at which the first event was detected, the specific location of the portable device, and the unique device identifier of each of the number of event detection devices through which the portable device will transit along the determined route to the specific location at which the first event was detected; and identifying, by the portable device, the route on the visual floor representation including the unique device identifiers of each event detection device along the route.

17. The method of claim 16, wherein the first event is at a detection device that detects of at least one of the following:

smoke;

a fire alarm trigger;

a fault in one or more devices of an event alarm system on the floor; or a breach of security.

18. The method of claim 16, further comprising providing audio route information to a user of the portable device.

19. The method of claim 16, wherein the method further includes providing event detection device indicators on the visual floor representation representing each event detection device through which the portable device will pass to transit to the specific location at which the first event was detected.

20. The method of claim 19, wherein the event detection indicator representing a particular one of the event detection devices visibly changes based on a proximity of the portable device to the particular event detection device.

* * * * *